(12) United States Patent
Gree

(10) Patent No.: US 8,929,812 B2
(45) Date of Patent: Jan. 6, 2015

(54) HYBRID RF POLLING LOOP FOR NFC DEVICE AND RETRY MECHANISM

(75) Inventor: Maxime Gree, Thehillac (FR)

(73) Assignee: NXP B.V., Eindhoven (NL)

( * ) Notice: Subject to any disclaimer, the term of this patent is extended or adjusted under 35 U.S.C. 154(b) by 171 days.

(21) Appl. No.: 13/609,895

(22) Filed: Sep. 11, 2012

(65) Prior Publication Data

US 2014/0073240 A1    Mar. 13, 2014

(51) Int. Cl.
*H04B 5/00*    (2006.01)

(52) U.S. Cl.
USPC ..................................... 455/41.1; 340/12.51

(58) Field of Classification Search
USPC .............. 455/41.1, 41.2, 39; 340/12.5, 12.51, 340/13.26
See application file for complete search history.

(56) References Cited

U.S. PATENT DOCUMENTS

| 8,693,949 | B2 * | 4/2014 | Royston | 455/41.1 |
| 2009/0144456 | A1 * | 6/2009 | Gelf et al. | 710/8 |
| 2010/0178866 | A1 * | 7/2010 | Jalkanen | 455/41.1 |
| 2012/0149305 | A1 * | 6/2012 | Zhodzishsky et al. | 455/41.2 |
| 2012/0214411 | A1 * | 8/2012 | Levy | 455/41.1 |
| 2013/0079026 | A1 * | 3/2013 | Hagedorn | 455/456.1 |

OTHER PUBLICATIONS

CLRC663 High performance NFC reader solution, Rev. 38—Feb. 6, 2014 171138, Product Data Sheet, 1-137.
NXP NFC controller PN544 for mobile phones and portable equipment, Industry-leading, 2nd-generation NFC Controller (Leaflet), 2010 NXP B.V.

* cited by examiner

*Primary Examiner* — Sonny Trinh

(57) ABSTRACT

Various exemplary embodiments relate to a method of controlling a near field communications (NFC) system, including: reading a number of low power iterations N from a memory; performing N low power polls; performing a normal power poll. Further, various exemplary embodiments relate to a method of controlling a near field communications (NFC) system, including: performing a low power poll of a tag; detecting a tag; initiating a first activation of the detected tag; receiving an indication that the first activation fails; reading a number of retries N from a memory; performing a second activation.

20 Claims, 2 Drawing Sheets

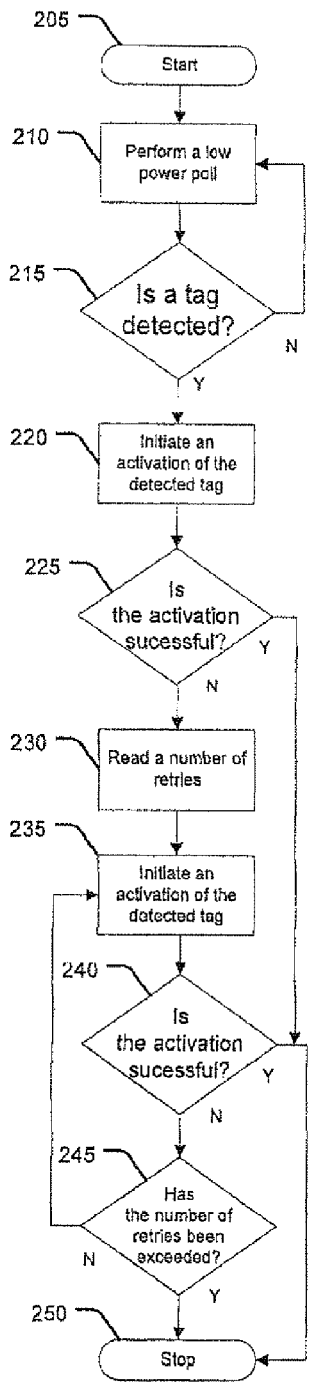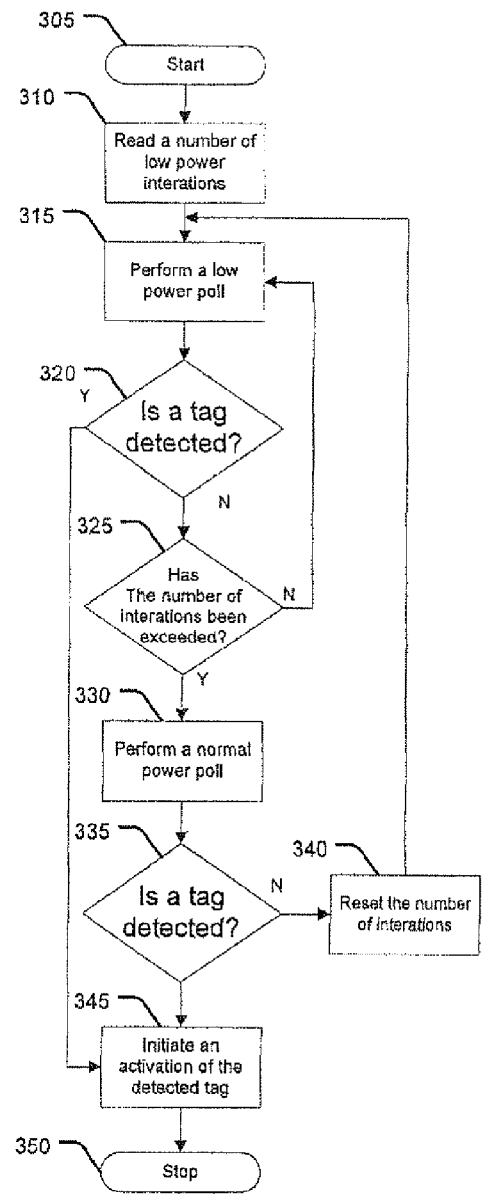
FIG. 2
FIG. 3

HYBRID RF POLLING LOOP FOR NFC DEVICE AND RETRY MECHANISM

TECHNICAL FIELD

Various exemplary embodiments disclosed herein relate generally to a hybrid RF polling loop for NFC devices and a related retry mechanism.

BACKGROUND

Integrated circuits implementing near field communications (NFC) are being integrated into many mobile devices, including for example, mobile phones, tablets, etc. In mobile devices it is desirable to minimize power consumption. Accordingly, it is desirable to reduce the power consumption of NFC devices.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various exemplary embodiments relate to a method of controlling a near field communications (NFC) system, including: reading a number of low power iterations N from a memory; performing N low power polls; performing a normal power poll.

Various exemplary embodiments relate to a method of controlling a near field communications (NFC) system, including: performing a low power poll of a tag; detecting a tag; initiating a first activation of the detected tag; receiving an indication that the first activation fails; reading a number of retries N from a memory; performing a second activation.

Various exemplary embodiments relate to a near field communications (NFC) controller, including: an radio frequency (RF) interface; a non-volatile memory; and a processor configured to: read a number of low power iterations N from the memory; perform N low power polls; and perform a normal power poll.

Various exemplary embodiments relate to a near field communications (NFC) controller, including: an radio frequency (RF) interface; a non-volatile memory; and a processor configured to: perform a low power poll of a tag; detect a tag; initiate a first activation of the detected tag; receive an indication that the first activation fails; read a number of retries N from the memory; perform a second activation.

BRIEF DESCRIPTION OF THE DRAWINGS

In order to better understand various exemplary embodiments, reference is made to the accompanying drawings, wherein:

FIG. 2 is a flow diagram showing a method of how a NFC controller in a NFC reader may retry the activation procedure for the tag; and FIG. 3 is a flow diagram showing a method of performing a specified number of low power polls for a tag followed by a single normal power poll for the tag.

To facilitate understanding, identical reference numerals have been used to designate elements having substantially the same or similar structure and/or substantially the same or similar function.

DETAILED DESCRIPTION

Figure 1:
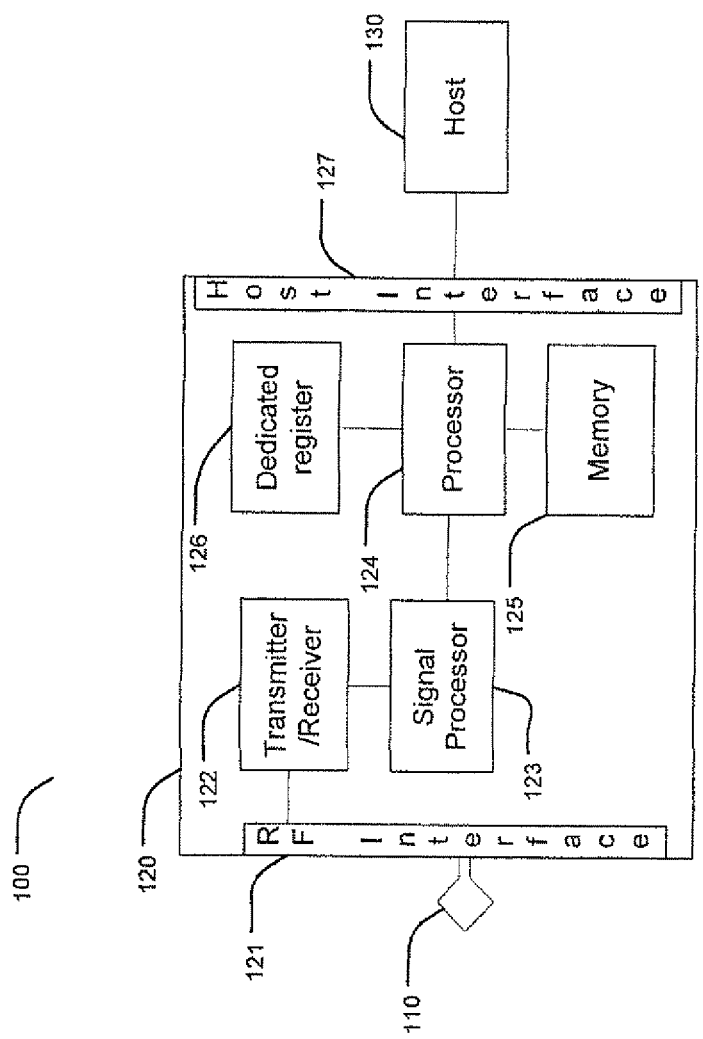
FIG. 1 is a block diagram of an embodiment of an NFC system.

Near field communication (NFC) is a short-range high frequency wireless communication technology which enables the exchange of data between devices over about a 10 centimeter distance. The technology is a simple extension of the ISO/IEC 14443 proximity-card standard (contactless card, RFID) that combines the interface of a smartcard and a reader into a single device. An NFC device may communicate with both existing ISO/IEC 14443 smartcards and readers, as well as with other NFC devices, and is thereby compatible with existing contactless infrastructure already in use for public transportation and payment. NFC is often aimed at usage in mobile phones.

A host NFC device may be a computing device such as a cell phone, mobile phone, smart phone, tablet, laptop, or desktop computer, or any other computing device. NFC host may also include other electronic devices. For example, NFC host may include a Bluetooth headset, speakers, video player, or any other electronic device. NFC host may include office equipment such as printers, facsimile machines, and copiers.

Further, NFC systems are used for a wide variety of applications including: identification, access, data transfer, payment, coupons, ticketing, and loyalty programs. The NFC device may act as a traditional RFID or NFC tag for any of these applications.

FIG. 1 is a block diagram of an embodiment of an NFC system. The NFC system 100 may include an antenna 110, an NFC controller 120, and a host 130.

The antenna 110 may be a loop antenna tuned to the expected received RF frequency. Any RF antennas may be used that meet the requirements of the NFC system.

The NFC controller 120 may include an RF interface 121, an transmitter/receiver 122, a signal processor 123, a processor 124, a memory 125, a dedicated memory 126, and a host interface 127. The RF interface 121 may be connected to the antenna 110 and receives/transmits an RF signal from/to the antenna 110. The RF interface 121 may be coupled to the transmitter/receiver 122 and provides the received RF signal to the transmitter/receiver 122. The transmitter/receiver 122 may demodulate a received RF signal. The transmitter/receiver 122 may also modulate an RF signal to be transmitted by the NFC system 100.

The signal processor 123 may receive a signal from the transmitter/receiver 122 and perform various processing on the signal. Such processing may include detecting information in the received signal and producing data that may be carried in the received signal.

The processor 124 may receive processed data from the signal processor 123 that is the data communicated to the NFC system 100. The processor 124 also may control the operation of the NFC system 100 as further described below. The processor 124 may be any type of processor capable of performing the various functions of the NFC controller 100. A memory 125 may be attached to the processor. Such memory 125 may be a non-volatile memory that maintains the data stored therein even when power is not applied to the NFC controller 100. An EEPROM is an example of such a memory. A dedicated register 126 may be a small non-volatile memory for storing specific information for use by the processor when in a low power mode so that the memory 125 or any other memory associated with the processor (for example, a volatile memory) may be turned off in order to reduce power consumption of the NFC system 100.

A host interface 127 may provide the ability of the NFC controller to communicate with the host device 130 using any type of communication protocol and interface used by the host device 130. The host interface 127 may implement various communication protocols and interfaces in order for a singl3 part to be used in various applications.

The NFC controller 120 may be implemented as a single integrated circuit. Further, certain functions in the NFC controller 120 may be implemented using instructions performed by the processor 125.

The host 130 may be a mobile phone, tablet computer, or any other sort of host device that would utilize NFC functionality.

There are two main NFC modes: Card emulation (and P2P target)—the NFC device behaves like an existing contactless card (e.g. payment, ticketing, transport, access control . . . ), that is the card does not generate an RF Field; Reader mode (or P2P Initiator)—the NFC device is active and reads a passive RFID tag, for example for interactive advertising. During this reader mode the NFC device will try to activate different type of NFC tags (ISO14443 type A and B; FeliCa; Jewel).

The NFC reader mode operates by producing an RF field in order to poll and to activate NFC tags. The RF field may be produced by transmitting a 100 ms pulse. The NFC reader then may listen for a response from a tag. If a tag is within the field and responds it will send a message back to the NFC reader. The NFC reader may then activate a connection with the tag. Activating the tag my include sequentially sending activation commands for various types of tags until a response is received. If no response is received, then the RF field may be turned off.

In order to reduce power usage of the NFC reader, a low power mode may also be used by the NFC reader to poll tags. The low power mode may use a 300 µs pulse which may greatly reduce power consumption of the NFC reader. Now, if a tag is introduced in the RF field, the tag will be detected during the 300 µs pulse. Then the NFC reader may transmit a 100 ms pulse in order to perform a full activation procedure for the tag.

One problem with the lower power mode is if one communication error (for example, framing errors, RF errors, parity or CRC errors) occurs during the activation, the activation will not be successful and the NFC reader will not be able to activate the tag. Accordingly, the NFC reader may return to the reader mode and transmit further polling pulses in order to detect tags.

In order to overcome this problem, an embodiment will be described that uses a retry mechanism when the low power mode detects a tag. The number of retries may be configurable to allow a user of the NFC reader to determine a setting that will improve the user experience.

FIG. 2 is a flow diagram showing a method of how a NFC controller in a NFC reader may retry the activation procedure for the tag. The method 200 may be performed by the NFC controller 120. The method 200 may begin at 205. First, the NFC controller 120 may perform a low power poll. Next, the NFC controller 120 my determine if a tag is detected. If not, the method 200 returns to step 210. If so, then the NFC controller 120 may initiate an activation of the detected tag 220. The NFC controller 120 then determines if the activation is successful 225. If so, then the method 200 ends at 250. If not, the NFC controller 120 reads a number of reties from memory 230. The NFC controller 120 initiates an activation of the detected tag 225 like in step 220 above 235. Next, the NFC controller 120 determines if the activation is successful 240. If so, then the method 200 ends at 250. If not, then the NFC controller determines if the number of retries has been exceeded 245. If so, then the method 200 ends at 250. If not, the method 200 returns to step 240 to initiate the activation of the tag again.

As can be seen in the flow chart, the method 200 performed by the NFC controller 120 may, upon the failure to active a tag after a low power poll detection of the tag, retry to activate the tag for a specified number of iterations.

Another problem that may arise in using a low power polling mode in the reader mode, is that some types of tags may not be detectable using the low power polling mode. Further, the low power polling mode reduces the RF range of the NFC system. In order to overcome these weaknesses a hybrid polling mode may be used. A hybrid polling mode may use both the low power polling pulse and a normal power polling pulse. An embodiment is described below that implements a hybrid polling mode where the number of low power polling pulses used for each single normal power polling pulse may be specified.

FIG. 3 is a flow diagram showing a method of performing a specified number of low power polls for a tag followed by a single normal power poll for the tag. The method 300 may be performed by the NFC controller 120. The method 300 may begin at 305. First, the NFC controller 120 may first read a number of low power iterations to perform 310. This number may be read from a dedicated register 126. The dedicated register may be powered during standby or other low power modes and still be readable by the processor in order for the NFC controller 120 to perform the method 300.

The NFC controller 120 may next perform a low power poll 315. As described above a low power poll has a shorter pulse, for example 300 us, in order to reduce power consumption while in a reader mode. Next, the NFC controller 120 may determine if a tag has been detected 320. If so, then the method 300 jumps to step 345 and initiates an activation of the detected tag. If not, the NFC controller 120 may determine if the number low power iterations has been exceeded 325. If not, then the method 300 returns to step 315 and performs another low power poll. If so, then the NFC controller 120 may perform a normal power poll 330. As described above a normal power poll uses the normal polling pulse (e.g., 100 ms) to poll the tag. Next, the NFC controller 120 may determine if a tag is detected 335. If not, then the NFC controller 120 resets the number of iterations 340 and then returns to step 315. If so, the NFC controller 120 initiates an activation of the detected tag. Then the method 300 ends at 350.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method of controlling a near field communications (NFC) system, the method comprising:
    reading a number of low power iterations N from a memory;
    performing low power polls until either a tag is detected or the number of low power polls reaches N; and
    performing a normal power poll.

2. The method of claim 1, further comprising:
    initiating, after the tag is detected, an activation of the detected tag.

3. The method of claim 1, further comprising:
    repeating performing N low power polls; and
    performing a normal power poll.

4. The method of claim 1, wherein the memory is a dedicated hardware register.

5. The method of claim 1, wherein the NFC system is in standby when performing each low power poll.

6. A non-transitory program storage device readable by a machine, tangibly embodying a program of instructions executable by the machine to perform the method of claim 1.

7. A method of controlling a near field communications (NFC) system, comprising:
    performing a low power poll of a tag;
    detecting the tag;
    initiating a first activation of the detected tag;
    receiving an indication that the first activation fails;
    reading a number of retries N from a memory; and
    performing a second activation.

8. The method of claim 7, further comprising:
    receiving an indication that the second activation fails; and performing a third activation.

9. The method of claim 7, further comprising:
    receiving an indication that the second activation was successful.

10. The method of claim 9, further comprising:
    disabling performing more than one activation.

11. The method of claim 7, further comprising:
    determining that N activations have been performed; and performing a normal power poll.

12. A non-transitory program storage device readable by a machine, tangibly embodying a program of instructions executable by the machine to perform the method of claim 7.

13. A near field communications (NFC) controller, comprising:
    an radio frequency (RF) interface;
    a non-volatile memory; and
    a processor configured to read a number of low power iterations N from the non-volatile memory, perform low power polls until either a tag is detected or the number of low power polls reaches N, and perform a normal power poll.

14. The NFC controller of claim 13, wherein the non-volatile memory is a dedicated register.

15. The NFC controller of claim 13, wherein the processor is further configured initiate an activation of the detected tag after the tag is detected.

16. An NFC host device comprising the NFC controller of claim 13.

17. The NFC host device of claim 16, wherein the NFC host device is one of a phone, a computer, an audio player, a video player, and a tablet computer.

18. A near field communications (NFC) controller, comprising:
    an radio frequency (RF) interface;
    a non-volatile memory; and
    a processor configured to perform a low power poll of a tag, detect the tag, initiate a first activation of the detected tag, receive an indication that the first activation fails, read a number of retries N from the non-volatile memory, and perform a second activation.

19. An NFC host device comprising the NFC controller of claim 18.

20. The NFC host device of claim 19, wherein the NFC host device is one of a phone, a computer, an audio player, a video player, and a tablet computer.

* * * * *